Nov. 28, 1950  F. V. WOOD  2,531,489
HAND TOOL FOR CRIMPING TUBE ENDS
Filed Sept. 18, 1946
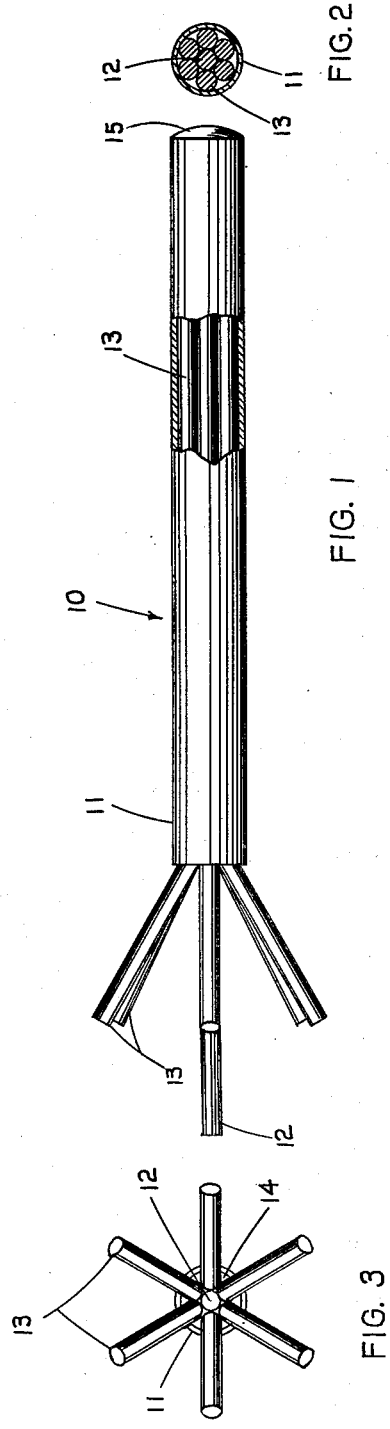
Inventor
FREDERICK VALENTINE WOOD Patented Nov. 28, 1950

2,531,489

UNITED STATES PATENT OFFICE 2,531,489

HAND TOOL FOR CRIMPING TUBE ENDS

Frederick Valentine Wood, Norfolk, Va.

Application September 18, 1946, Serial No. 697,619

2 Claims. (Cl. 81—15)

(Granted under the act of March 3, 1883, as amended April 30, 1928; 370 O. G. 757)

This invention relates to a tube crimping tool and has for an object to provide a tool especially designed for crimping the end of a tube of the type used in assembling oil coolers or radiators. Such oil coolers and radiators are made up of a number of tubes whose ends must be soldered into a common container, and for so assembling the tubes, it is necessary to crimp the ends of the tubes to permit the flow of solder uniformly around each tube thereby insuring a leakproof seal. The present method of so crimping the tube involves the use of a sharp pointed tool to crimp the tube, and is comparatively slow, due to the extreme care that must be exercised to avoid damaging the cooler, and the fact that twelve separate and distinct operations must be performed for each tube.

It is an object of this invention to provide a tube crimping tool which eliminates these twelve separate operations in favor of a single operation that does a complete crimping job, makes it impossible to damage the coolers, and is vastly faster than the old method.

With the foregoing and other objects in view, the invention consists in the construction, combination and arrangement of parts hereinafter described and illustrated in the drawings in which:

Fig. 1 is an elevational view of the tool of this invention.

Fig. 2 is a sectional view through the tool handle.

Fig. 3 is an end view of the operating end of the tool, and

Fig. 4 is a perspective view of a tube which has been crimped by this tool.

There is shown at 10 the tube crimping tool of this invention. This tool consists of a small cylinder 11 of appropriate size into an open end of which are inserted or press fitted a plurality of rods, here shown as consisting of a center rod 12 surrounded by six rods 13. Each of the surrounding rods 13 is bent outwardly at an angle of 30° from the center rod 12, the center rod 12 extending a substantial distance from the open end 14 of the cylinder 10, while the bent ends of the surrounding rods 13 extend but a short distance. The other end of the cylinder 11 is filled with weld metal after the rods have been inserted and secured and then rounded off and ground smooth at 15, thus finishing the tool. As an example of suitable dimensions for the various parts, the cylinder is ½ inch in outside diameter and ⅜ inch inside diameter. The rods 12 and 13 are each ⅛ inch in diameter and extend through the tube, bent rods 13 extending one inch beyond the open end 14 of the cylinder and at an angle of 30° to the longitudinal axis thereof. The center rod 12 extends three inches beyond the open end 14 of the cylinder.

There is shown at 16 in Fig. 4 a typical detail of an oiling tube after the crimping tool 10 has been applied. This tube 16 includes the conventional enlarged end 17 which has been prepared for a soldered assembly job by inserting the center rod 12 therein and abutting the bent rods 13 against the outer side of the enlarged end 17 until the edge has been crimped a suitable amount at 18 as shown, thus preparing the tube for assembly in a single operation.

Other modifications and changes in the number and arrangement of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

What is claimed is:

1. A tube crimping tool comprising a central rod, a plurality of rods surrounding said central rod and having rigid free ends extending at an angle to said central rod, and means securing said central and surrounding rods together in lateral engagement with one another as a unitary tool, said securing means comprising a close fitting cylindrical member in which said rods extend.

2. A tube crimping tool comprising a substantially cylindrical handle member, a center rod and a plurality of surrounding rods extending from said handle member, said center rod extending axially from the handle member substantially beyond the surrounding rods, said surrounding rods extending at an angle to said center rod, whereby when said center rod is sufficiently inserted axially into an open ended tube to be crimped said surrounding rods will abut and crimp the open end of the tube.

FREDERICK VALENTINE WOOD.

REFERENCES CITED

The following references are of record in the file of this patent:

UNITED STATES PATENTS

| Number | Name | Date |
|---|---|---|
| 1,139,083 | Takacs | May 11, 1915 |
| 1,268,922 | Bryan | June 11, 1918 |
| 1,344,800 | Johnson | June 29, 1920 |
| 1,569,638 | Steele | Jan. 12, 1926 |